United States Patent [19]

French

[11] Patent Number: 4,883,271

[45] Date of Patent: Nov. 28, 1989

[54] SPORTS IMPACT MEASURING APPARATUS

[75] Inventor: Barry J. French, Bay Village, Ohio

[73] Assignee: French Sportech Corporation, Bay Village, Ohio

[21] Appl. No.: 182,913

[22] Filed: Apr. 18, 1988

Related U.S. Application Data

[63] Continuation-in-part of Ser. No. 785,969, Oct. 10, 1985, Pat. No. 4,761,005, and a continuation-in-part of Ser. No. 904,356, Sep. 8, 1986, Pat. No. 4,824,107.

[51] Int. Cl.$^4$ .................. A63B 67/00; A63B 69/00
[52] U.S. Cl. .................. 273/1 GC; 273/1 E; 272/76; 272/77
[58] Field of Search .............. 273/1 GE, 1 GC, 1 F, 273/1 E; 272/76, 77

[56] References Cited

U.S. PATENT DOCUMENTS

| | | | |
|---|---|---|---|
| 4,194,401 | 3/1980 | Claassen et al. | 73/730 |
| 4,208,048 | 6/1980 | Winterbottom | 272/76 |
| 4,216,403 | 8/1980 | Krempl | 310/328 |
| 4,330,119 | 5/1982 | Marshall, Jr. | 272/76 |
| 4,404,854 | 9/1983 | Krempl | 73/730 |
| 4,527,796 | 7/1985 | Critelli | 272/77 |
| 4,534,557 | 8/1985 | Carlin et al. | 273/1 GC |

OTHER PUBLICATIONS

"Separating the Strong from the Flashy: Measuring the Power in Karate Techniques", by Peter Fritsche and Sabastian Hoeher, pp. 51-53.

Primary Examiner—Leo P. Picard
Assistant Examiner—Jessica Harrison
Attorney, Agent, or Firm—D. Peter Hochberg; Mark Kusner; Louis J. Weisz

[57] ABSTRACT

A sports impact measuring apparatus for indicating at least one characteristic of an externally applied impact, comprising a deformable, resilient support having a compressible impact region and expandable regions, a piezoelectric strip extending substantially around an expandable region, and an electronic indicator electrically connected to the piezoelectric strip.

24 Claims, 2 Drawing Sheets

SPORTS IMPACT MEASURING APPARATUS

CROSS REFERENCE TO RELATED APPLICATION

This application is a continuation-in-part of U.S. patent application Ser. No. 785,969, now U.S. Pat. No. 4,761,005, filed Oct. 10, 1985, and also a continuation-in-part of U.S. patent application Ser. No. 904,356, now U.S. Pat. No. 4,824,107, filed Sept. 8, 1986, which is also a continuation-in-part of Ser. No. 785,969.

TECHNICAL FIELD

This invention relates to training equipment for athletes. Specifically, this invention relates to punching bags, body shields, punch mitts, sparring vests and other devices designed to be struck by boxers, practitioners of the martial arts and athletes involved with other contact sports, to build strength and speed. This invention relates to the devices which provide the user with an indication of the force, velocity, energy and/or frequency of impacts imparted to the device. The invention also finds applicability in various toys and games involving such indications of force, speed etc. for balls and other projectiles.

BACKGROUND ART

Training devices designed to be struck by an athlete's hands or feet are well known in the prior art. A very few of these devices are adapted to provide the user with an indication of how effectively his or her blow has struck the device for providing the athlete with feedback on his or her performance to allow the user to improve his or her technique.

A punching bag which provides feedback to the user concerning impact force is described in U.S. Pat. No. 4,208,048. This device includes an air bladder mounted on the exterior of a punching bag. The air bladder is connected to a pressure gauge. When the athlete strikes the bladder, pressure inside the bladder rises. The pressure rise is communicated to the athlete on the gauge. This device has several deficiencies. First, it is difficult to maintain constant internal pressure in the bladder, as leakage can be expected due to repeated impacts over a period of time. In addition, the pressure in the bladder can vary with changes in ambient temperature, as well as with temperature changes that result from repeated impacts. Another problem is that conventional air pressure gauges may not provide sufficiently fast response to obtain a true indication of the force of the impact.

Another device which provides an athlete feedback concerning impact force is shown in U.S. Pat. No. 4,330,119. This patent also employs a bag inflated with air and a pressure gauge readout. This device can be expected to have the same deficiencies as the device shown in U.S. Pat. No. 4,208,048. In fact, bags made according to the foregoing patent have been found to yield inaccurate readings due to temperature changes and air leakage from the bag.

The athletic bag shown in U.S. Pat. No. 4,527,796 is an inflatable bag holding pressurized air over a reservoir of water. A sensor detects the rise in air pressure and givs a readout proportional to the impact. The problem with systems of this type is that air pressure is subject to changes of temperature and repeated impacts tend to cause air leakage. Further, the presence of air in the bag would likely cause the water to "slush", causing extraneous signals at the sensor which effect the accuracy of the readout. This internal turbulence in the bag could be expected to be particularly problematic when the athlete strikes the bag rapidly and repeatedly. Another draw back of this system is that the sensor must be compatible with both air and water due to the likelihood that water will reach the sensor.

Another system for detecting and indicating the strength of an impact was described in the January 1979 issue of *Karate Magazine*. This system uses a leather bag completely filled with water to a slight over pressure. The bag has an internal pressure transmitter. A signal from the internal pressure sensor is displayed at an external readout to provide the athlete with feedback. A problem that can be expected is that residual waves or vibrations inside the bag would produce extraneous signals which would adversely effect the sensor readings, particularly when the bag is struck in rapid succession.

A shortcoming of all fluid filled bags used particularly by practitioners of the martial arts is the low comfort factor; that is, it doesn't have the right "feel" as compared to foam-filled bags and the like. Fluid filled bags are usually too resilient, and the user's hands or feed rebound too quickly than most martial arts practitioners would like.

Thus, there exists a need for athletic training apparatus which receives an impact from an athlete, and which provides an accurate indication of the velocity, force, frequency and/or energy of the impacts. There further exists a need for such an apparatus that is suitable for measuring fast and repeated blows. There further exists a need for an apparatus for measuring blows which is more reliable, less sensitive to changes and temperature, and more readily transportable than existing apparatus.

SUMMARY OF THE INVENTION

It is an object of the present invention to provide an impact indicating sports apparatus that provides an accurate indication of the velocity, force, frequency, and/or energy of impacts.

It is a further object of the present invention to provide an impact indicating sports apparatus that provides accurate information during fast and repeated impacts over a generally large impact area.

It is a further object of the present invention to provide an impact indicating sports apparatus which is more reliable and provides more accurate information than existing devices.

It is a further object of the present invention to provide a fluid-containing impact indicating apparatus that is less sensitive to temperature changes than existing devices containing fluids.

It is a further object of the present invention to provide an impact indicating athletic training apparatus that is easier to take down, transport and set up than existing devices.

Yet another object is to provide an impact measuring device which can be retrofitted on existing impact-receiving products.

Further objects of the present invention will be made apparent in the following description of the invention and the appended claims.

The foregoing objects are accomplished according to the preferred embodiments by an athletic training apparatus including a compressible container which compresses in a region of impact and expand elsewhere. The apparatus according to the various preferred embodiments can be an elongated bag containing a fluid, particulate matter, foam, rags or the like; a similarly filled body shield; or a punch mitt of similar construction.

A strip of piezoelectric material extends about the container away from the area of impact. A piezoelectric material varies an electrical potential as its length changes or as it is stressed. The piezoelectric strip is preferably attached directly to the surface of the container and moves therewith. As explained hereinafter, the piezoelectric strip material employed in the preferred embodiments comprises a pair of thin metal film conductors sandwiching a piezoelectric material. Leads are attached to the respective metal film conductors to facilitate the connection of the piezoelectric strip to other electrical circuitry. The piezoelectric strip electrodes are connected by an electric cable to an indicating device such as an oscilloscope or digital readout. The indicating devices shows how the electrical potential of the piezoelectric strip changes.

When an athlete strikes the container, the force causes the outer surface of the container to be compressed in the area of the impact. This causes the remainder of the container, including that portion about which the piezoelectric film is wrapped, to expand which causes a change in the strip's electrical potential. This change in electrical potential is transmitted to the indicating apparatus to yield an analog readout or to be processed to yield a digital readout. Depending on the type of the indicating apparatus used and how it is programmed, the athlete may receive immediate feedback concerning impacts on the bag. For example, the athlete may receive an indication of "hitting power" directly from the signal corresponding to the maximum elongation or stress of the piezoelectric strip. In addition or in the alternative, the analog signal could be differentiated to provide an indication of velocity, or integrated to provide an indication of energy imparted by the blow.

DETAILED DESCRIPTION OF THE PREFERRED EMBODIMENTS

Figure 1:
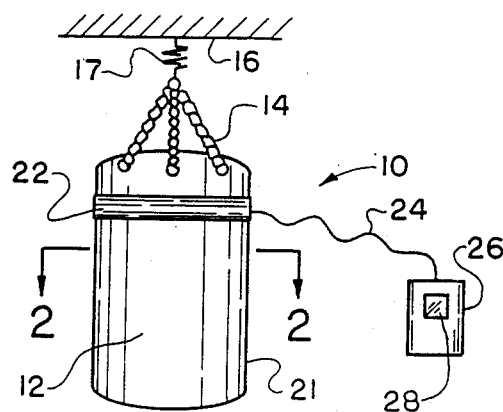
FIG. 1 is a side elevational view of an impact indicating athletic training apparatus in the form of a heavy bag according to an embodiment of the present invention.
Figure 2:
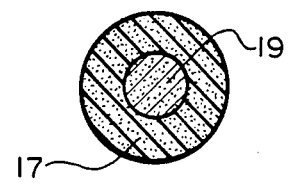
FIG. 2 is a cross-sectional view taken in the direction of arrows 2—2 in FIG. 1 for a foam and sand-filled device.

Referring now to FIG. 1, an impact indicating athletic training apparatus in the form of a heavy bag apparatus is generally indicated by reference number 10. The apparatus includes a hitting bag 12 for receiving impacts from the hands, feet or body of an athlete. Bag 12 is suspended from its upper end by chains, ropes or cables 14 which are attached to the bag. Chains 14 extend to a stationary support 16 overhead. A spring 17 can be interposed between chains 14 and support 16 to dampen secondary force waves resulting from impacts on the bag. In one preferred form, bag 12 has a compressible foam filling and a dense core. As shown in FIG. 2, the filling can comprise a hollow foam cylinder 17 having a sand-filled core 19. The foam should have high tear strength, and it should be compressible and resilient. Particularly suitable forms are white ether foams having density values of SL23 and SL65 from Stephenson and Lawyer Grand Rapids, Michigan. Various polyurethane foams would also be suitable. The bag should have a resilient, durable covering 21 which serves as a container for the filling. It can be an impermeable bag made of nylon impregnated vinyl.

In an alternate form of the embodiment of FIG. 1, bag 12 is comprised of a resilient outer membrane layer 21 and is fully filled with water or other incompressible fluid. Bag 12 then includes an inlet valve which can be selectively opened and closed to admit or discharge the fluid. The valve may be attached to a hose to fill the bag.

In the preferred forms of the embodiment of FIG. 1, the bag is cylindrical in shape with a height of 36–45 inches, an outer diameter of 14–16 inches, and a circumference of 36–45 inches. The bag may be of the type commercially available from Powair Corporation.

Flexible transducer means 22 is mounted on bag 12. In the preferred form of the embodiment of FIG. 1, transducer means 22 is a strip of piezoelectric material which runs about the circumference of the bag below its upper end. As later explained, the piezoelectric strip is oriented to measure dimensional changes in the bag caused by impacts imparted by the athlete. The piezoelectric film used in the preferred forms of the invention is of the type sold by Pennwalt Corporation, Piezo Film Group. Applicant has found that it is desirable to laminate the film on both sides with a covering of 4–5 mil MYLAR material. This protects the film from dirt and prevents damage from the impacts, especially from inadvertent direct blows to the transducer strip which may occur from time-to-time. The film is bonded to the surface of bag 12 using an adhesive material such as type 94/84 vinyl resistant tape produced by the 3M Company.

The ends of the strip of piezoelectric film are adjacent each other and are connected to a two-conductor cable 24. Cable 24 is connected to an indicating apparatus 26 which in FIG. 1 can be a digital readout device or an analog readout device such as an oscilloscope. The apparatus provides on its screen 28 either a digital or an analog readout of the change in the electrical voltage potential of the piezoelectric strip. Further details of the indicating device are provided below.

In operation, an athlete strikes bag 12 at a location away from the sensing means. The impact deforms resilient outer covering 21 of the bag and displaces the bag's contents inside adjacent the place of contact. The displacement of the water causes a rapid dimensional expansion of the circumference of the bag away from the place of impact.

The dimensional change in the circumference of the bag results in a corresponding elongation of the piezoelectric strip. The strip changes its electrical potential in response to the dimensional change. This change in the electrical potential is transmitted as an electrical signal through cable 24 to indicating apparatus 26 where it produces digital readout or a wave form on screen 28, depending on the nature of apparatus 26.

Figure 3:
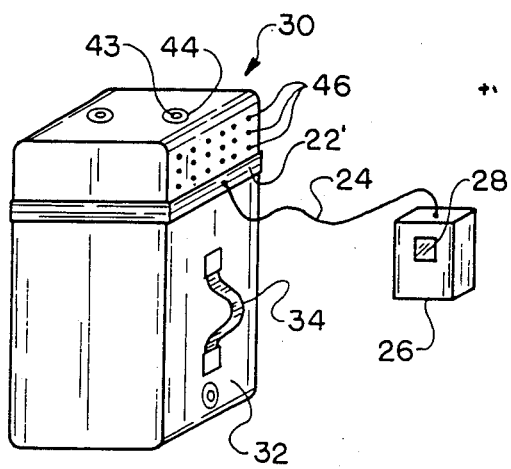
FIG. 3 is a perspective view of an impact indicating apparatus in the form of a body shield according to another embodiment of the invention.
Figure 4:
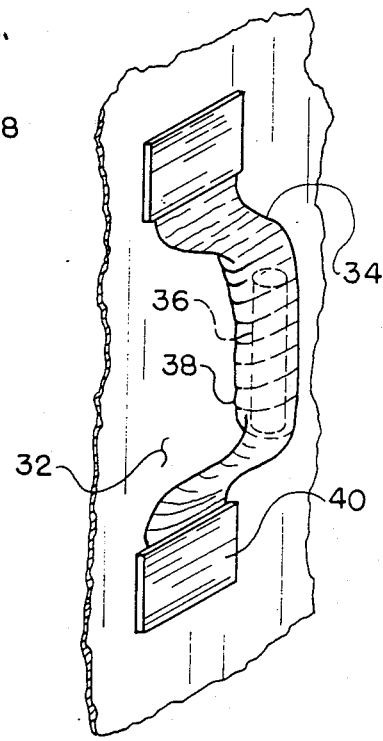
FIG. 4 is a detail of a handle portion of the embodiment shown in FIG. 3.
Figure 5:
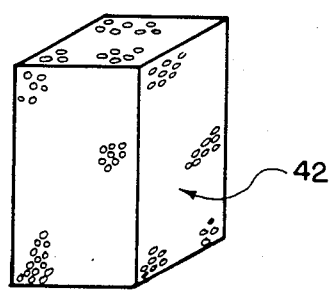
FIG. 5 is a perspective view of a foam insert for use in the embodiment in FIG. 3.

Another embodiment of the invention is shown in FIG. 3. A body shield 30 is depicted for receiving blows from the feet, hands or body of a martial arts practitioner. Body shield 30 has a generally parallelepiped configuration, and includes a cover or container 32 of this configuration for holding an appropriate filler. A pair of handles 34 are secured on opposite sides of cover 32, which, as shown in FIG. 4, can be comprised of gripper tubes 36 disposed within webbing wraps 38. Wraps 38 can be attached at their ends to cover 32 by means of leather reinforcing tabs 40 stitched around corners on opposite sides of cover 32. Cover 32 preferably contains a foam insert 42 of the type shown in FIG. 5. Insert 42 preferably is slightly larger than the inner dimensions of cover 32, so that the insert overstuffs cover 32 and is under continuous compression when in the cover. For example, cover 32 preferably has a height of 24 inches, a width of 14 inches and a depth of 5 inches; and insert 42 has a height of 24 inches, a width of 15 inches and a thickness of 6 inches. This assures a constant stress on the transducer or sensor as discussed below. The foam is preferably an open cell, light, resilient foam material such as an appropriate white ether foam or a polyurethene foam as described earlier. Cover 32 preferably is made of a durable, flexible material such as nylon impregnated vinyl, and has had orifices 43 defined by grommets 44 and/or perforations 46 for discharging air when the shield is struck by a blow.

A flexible transducer 22' of the type identified by reference number 22 in FIG. 1 is disposed near an end of the body shield where it is unlikely to be struck by a blow. An appropriate distance for a shield having the dimensions referred to above would be 6 inches from the top of the shield. Transducer 22' is preferably a mylar laminated piezoelectric strip secured to cover 32 by means of an appropriate adhesive as discussed above with reference to transducer means 22. Its ends are spaced slightly from each other and connected to a two-conductor cable 24, which is in turn connected to an electronic indicator 26 having a screen 28.

In use, while one person holds body shield 30 against the body by means of handles 34, the user strikes the face of the shield somewhere below transducer 22'. The blow compresses the filling of cover 32 by an amount corresponding to the strength of the blow, and the filling expands elsewhere including in the space within transducer 22'. This expansion deforms the transducer and causes the latter to generate a voltage signal corresponding to the amount of its deformation, and this signal causes a display reflective of the value of the signal on screen 28'. Air driven away from the compressed part of shield 30 causes a discharge of air through orifices 43 and/or perforations 46. When the compressed material returns to its uncompressed state, air is drawn back into the contents. A smaller version of this embodiment can be attached to a wall or other support, such as by means of a Velcro strip attached to the back of the shield for releasable engagement with a corresponding Velcro strip attached to the support.

Figure 6:
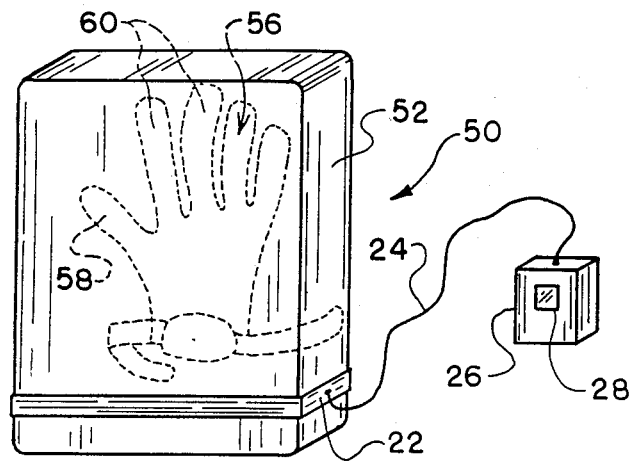
FIG. 6 is a perspective view of an impact indicating apparatus in the form of a punch mitt according to another preferred embodiment of the invention.
Figures 7, 8:
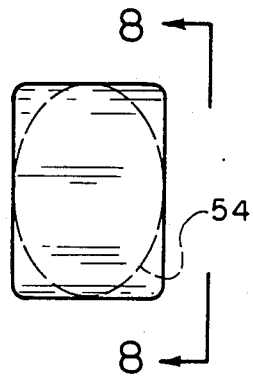
FIG. 7 is a front view of a liner for use in the punch mitt illustrated in FIG. 6.
FIG. 8 is a side elevation taken in the direction of arrows 8—8 in FIG. 7.

Referring next to FIGS. 6-8, a punch mitt 50 is shown. Mitt 50 has an outer cover 52 of generally parallelepiped configuration, and is preferably made from nylon impregnated vinyl to give it the desired flexibility and suppleness. It can be made from flat panels which are stitched at the seams. A transducer strip 22'', much like strips 22 and 22' described previously and composed of mylar laminated piezoelectric film, is wrapped around mitt cover 52 near the base portion thereof so as to be out of the normal hitting area of the mitt as discussed below. For a mitt of a preferred height of 11 inches, a width of 8 inches and a thickness of 6 inches, the strip should be disposed about 1 inch from the base. As in the preceding embodiments, strip 22'' should have ends which are close to each other and connected by electrical leads to provide a closed circuit. Leads 24 run from strip 22'' to electronic indicator 26 for effecting an output on screen 28.

Although liners such as flexible and resilient foams or incompressible fluids could be used as a filler for mitt 50, an inflatable liner or bladder 54 which has an elastomeric composition is preferred for its ease of installation, ease of inflation (with a common air pump) and comfort to one striking the mitt. Liner 54 should be inflated to over fill cover 52 as shown most clearly in FIG. 8. A preferred pressure range is 0.8 to 1.5 psi, since higher pressures can cause the mitt to be so hard as to cause pain to the user and lower pressures preclude an adequate rebound of a blow. Liner 54 should have a conventional air inlet/discharge valve and cover 52 can have a zipper or the like to permit insertion of the liner.

A glove 56 is attached to the rear part of cover 52 as shown by dotted lines in FIG. 6. Glove 56 is generally constructed like the back portion of a baseball catcher's mitt, and includes a flexible outer panel having appropriate internal dividers to define a thumb stall 58 and finger stalls 60. Glove 56 and the finger stalls (dividers) is preferably made of the same material as cover 52, e.g., nylon impregnated vinyl, and the various components are held in place by stitching. The glove is located above transducer means 22'' to avoid any hindrance to the operation of the mitt.

In use, one person puts his or her hand in mitt 56 and holds his arm outstretched to present a target to the user. The user strikes mitt 50 above transducer means 22'' on the face of the mitt, and the values associated with the blow are displayed on screen 28. As discussed below, these values could include the force of the blow, the total energy transferred to the mitt over periods of time, the frequency at which blows are landed, etc.

As in the other embodiments, as each blow is landed on mitt 50, the liner is compressed at the place of impact, and a corresponding expansion of the liner occurs elsewhere—including the space within transducer strip 22''. The stress and distortion imparted to the transducer cause the generation of a voltage signal corresponding to the value of the impact. This signal is transmitted to indicator 26 where it is processed and its value is displayed on screen 28.

The piezoelectric material referred to with respect to the various embodiments described herein is preferably a polyvinylidene fluoride (PVDF) film, sandwiched between thin metallized layers of electrically conductive metal. This is the same material described in co-pending U.S. patent application Ser. Nos. 785,969 filed Oct. 10, 1985 and 904,356 filed Sept. 8, 1986, and incorporated herein by reference. This multi-layered material is marketed under the trademark KYNAR by Pennwalt Corporation, 900 First Avenue, King of Prussia, Pennsylvania. As used in the embodiments described herein, the piezoelectric film is approximately 28 microns in thickness, and the opposed metallized layers are silver of about 0.1 microns in thickness.

Figure 9:
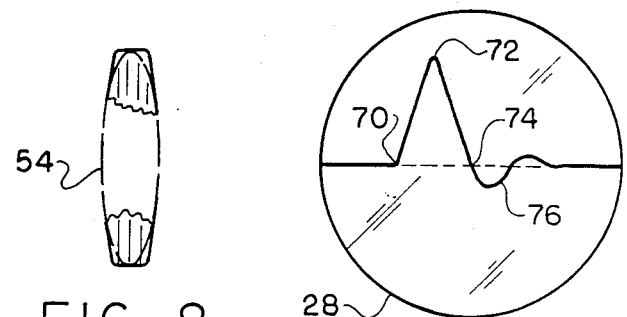
FIG. 9 is a schematic view of a wave form produced by an impact on a container incorporated in embodiments of the present invention, as indicated on the screen of an oscilloscope connected to the piezoelectric material which surrounds the container.

A wave form produced by typical impact is shown in FIG. 9 which illustrates an oscilloscope screen, which could constitute screen 28 on electronic indicators 26. The wave form starts at an initial point 70 which corresponds with the athlete's blow making contact with an impact measuring apparatus according to the invention. The wave form than rises upward with time to a peak 72 which corresponds to the maximum displacement of the surface of the apparatus by the impact. Thereafter, the wave form falls with time in correspondence with the retraction of the athlete's hand or foot from the surface of the apparatus falling back to its original electrical potential at 74. Thereafter, the residual waves in the bag caused by the impact create some anomalous signals or "noise" in the wave form 76. The noise rapidly dampens out. Thus, the device is able to provide accurate indication of impacts delivered in rapid succession. Applicant has found that sensing the impact on the surface of the bag in the circumferential direction particularly reduces the amount of "noise" and allows the apparatus to measure numerous impacts per second.

Figure 10:
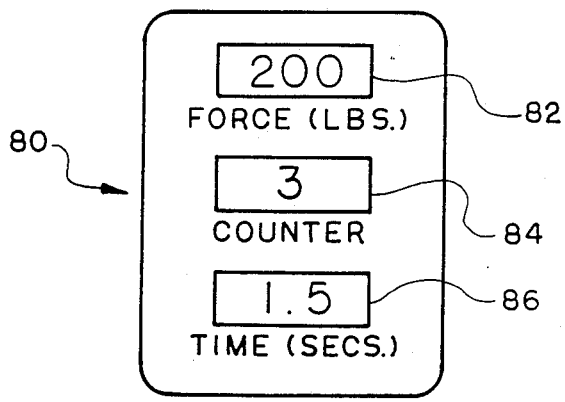
FIG. 10 is a front view of a digital readout device for indicating values of measurements made by the respective embodiments of the invention.

A digital version of readout or indicator 26 is shown in FIG. 10, where it is generally indicated by reference number 80. The digital systems can employ any of various digital circuit designs. Such digital circuits can have means for converting analog signals generated by the piezoelectric strip into digital signals, with the ultimate displays being light emitting diodes or the like. Indicator 80 includes a first or force indicating screen 82 for indicating the value of the force of an impact applied to the impact receiving portion of the embodiment of the invention to which the piezoelectric device of indicator 80 is connected. A counter 84 can be provided for indicating the number of impacts rendered to the impact receiving portion. Circuitry can be provided for only indicating the umber of impacts which exceed a specified threshold value, such as pounds of force, to avoid counting weak blows, glancing blows and noise. An electronic filter can be used to preclude the transmission of signals having magnitudes below a certain threshold value, and means can be employed for changing that threshold to accommodate the strength and skill of the person using the apparatus. Means can be incorporated in indicator 80 for resetting force indicating screen 82 and/or counter 84 after the occurrence of some event, such as the passing of a pre-determined amount of time after a blow without the detection of a subsequent blow, or after the passing of a pre-determined period of time after the detection of a first blow.

A clock 86 can be provided for indicating the amount of time during which the system has been in use in any session, or the amount of time which has transpired during a sequence of blows. The latter time value can be used to determine the rate at which blows having force magnitudes above a pre-determined level have been rendered. Again, means can be provided for resetting counter 86, and the resetting means can be manual or automatic.

Various other useful information can be displayed on the readouts of device 80. For instance, the magnitudes of force signals rendered over a period of time can be integrated to indicate the energy transmitted to the impact receiving apparatus. Values of velocity and power can be provided as well, as long as the system is provided with the necessary known values. Integrating this area can be accomplished by using conventional apparatus and may be provided as feedback to the athlete as a digital readout. In other types of training, the velocity of the impact may be of most interest. Velocity may be determined by differentiating a portion of the wave form between points 70 and 72 in FIG. 9. Other impact characteristics can also be calculated depending on the parameter of interest.

The indicating means may in some applications be combined or used in conjunction with a recording device. Thus, the athlete can review a series of impacts or blows after a workout session. The recording devices used in conjunction with the apparatus of the present invention may be coordinated with a video recorder so that the athlete may review not only the impact of each blow, but also the technique that was used in delivering it. This provides the athlete with a further tool to analyze and develop technique.

It can be noted that while the preferred form of the invention uses a piezoelectric film strip for sensing the elongation of the bag, other types of flexible transducing devices may also be used successfully. For example, strain gauges such as large area strain gauges manufactured by Omega Engineering, Inc. of Stamford, Connecticut could be employed in place of the piezoelectric device described above. It has been found that strain gauges of sufficient length to extend around the container of the impact receiving device are not readily available, and it may be necessary to connect a number of such strain gauges together to extend around the container.

Three embodiments of the invention have been described above. As noted earlier, the invention is particularly suited for obtaining information about blows rendered by athletes. In addition to the bag, body shield and hitting mitt noted above, the invention can be employed in boxing gloves, football blocking and tackling dummies, targets at which balls and other projectiles are thrown, and the like. Furthermore the invention could be used for scoring purposes to indicate, for example, both the landing of a blow and the force or other characteristics of the blow. The use of a piezoelectric film as the flexible transducer makes possible a very durable product since there are few if any mechanical connections (such as linkages, screws, nuts and bolts, etc.). Furthermore, since piezoelectric films are very sensitive and yield a linear response over a broad range of force inputs, accurate results are obtainable for impacts varying from those of only a few pounds to impacts of hundreds of pounds and more, without the need for costly detecting devices. The flexible piezoelectric film strip preferred herein can be assembled on new products, and in addition can be retrofitted on existing sports equipment such as body shields, punching bags, etc. to enable the measure of various values associated with the impacts with the impacts.

The invention has been described in detail, with particular emphasis on the preferred embodiments, but it should be understood that variations and modifications within the spirit and scope of the invention may occur to those skilled in the art to which the invention pertains.

I claim:

1. Sports impact measuring apparatus for indicating at least one characteristic of an externally applied impact, said apparatus comprising:
   a deformable, resilient support for receiving impacts, said support being compressible at the region of the impacts and expandable at parts of said support away from the region of impact;
   flexible transducer means mounted on said support around said expandable part of said support for generating an electrical signal having at least one characteristic varying in accordance with to the extent of the expansion of said expandable portion in accordance with the value of said impact characteristic; and
   indicating means connected to said transducer means for indicating at least one value of a characteristic of said electrical signal.

2. The invention according to claim 1 wherein said flexible transducer means comprises flexible piezoelectric means.

3. The apparatus according to claim 2 wherein said indicating means includes means for generating an intelligible analog output signal reflective of a value of a characteristic of said electrical signal.

4. The apparatus according to claim 2 wherein said support comprises a container for being filled with a fluid.

5. The apparatus according to claim 4 wherein said container has a circular cross sectional portion and said piezoelectric means comprises a strip of piezoelectric film extending substantially about a circumference of said cross sectional portion.

6. The apparatus according to claim 2 wherein said support comprises a container for holding a resilient material.

7. The apparatus according to claim 2 wherein said support comprises a bag containing a material for rendering said bag resilient, and wherein said apparatus further includes supporting means for holding said bag upright to position said bag to receive impacts at a first portion of said bag and said piezoelectric means is disposed apart from said first portion to avoid impacts on said piezoelectric means.

8. The apparatus according to claim 2 wherein said indicator means includes means responsive to rates of increase of the value of said signal for indicating the velocity of said impact.

9. Apparatus according to claim 2 wherein support includes a container for holding gas for rendering the container resilient.

10. Apparatus according to claim 2 wherein said support includes a container for holding an incompressible fluid for rendering the container resilient.

11. Apparatus according to claim 2 wherein said support means includes a container, the container including a compressible, resilient material for rendering the container resilient.

12. Apparatus according to claim 11 wherein said compressible, resilient material is a polymer foam.

13. The invention according to claim 2, wherein said apparatus comprises a body shield, and said support includes a generally flat forward face having outer edge portions, said flexible piezoelectric means being disposed near an outer edge portion and said impact region being disposed away from said piezoelectric means.

14. A body shield according to claim 13 wherein said piezoelectric means is disposed near the upper edge portion of said shield, and said impact region is disposed below said upper edge portion.

15. A body shield according to claim 13 wherein said support includes a compressible material for rendereing said support resilient.

16. A body shield according to claim 13 and further including handles on opposite sides of said shield.

17. The invention according to claim 2 wherein said apparatus comprises a hitting mitt having front and rear faces and outer edge portions, and said support includes a container for holding a material for rendering said container resilient and glove means attached to said rear face to enable a person to hold said mitt to present said front face as a target, said flexible piezoelectric means being disposed near an outer edge portion and said impact region being disposed away from said piezoelectric means.

18. The invention according to claim 2 wherein said piezoelectric means comprises a laminated piezoelectric strip.

19. Sports impact measuring accessory for measuring at least one characteristic of an impact externally applied to a deformable, resilient support, the support being compressible at the region of impacts and expandable at parts of said support away from the region of impacts, said accessory comprising:
   flexible piezoelectric strip means mountable on said support substantially around an expandable part of said support for generating electrical signal in accordance with the amount of expansion of said expandable part as a result of impacts rendered to said support; and
   electronic indicating means electrically connected to said piezoelectric strip means for indicating a value of said electrical signals.

20. The invention according to claim 19 wherein said piezoelectric strip means further includes a protective plastic lamination.

21. A flexible transducer means for measuring at least one characteristic of a sports impact on a resilient support for receiving such impacts, said resilient support comprising a resilient material compressible at the region of impact and expandable at parts of said support away from the region of impact, said means including a flexible means for generating an electrical signal having at least one characteristic varying in accordance with the extent of movement of the resilient support, and means for holding said flexible means relative to the expandable parts of said resilient support to detect such movement.

22. The transducer means of claim 21 wherein said flexible means is a piezoelectric means.

23. A boxing glove for indicating impacts thereon, said boxing glove comprising a compressible, resilient impact area for making or receiving impacts and an expandable, resilient area away from said impact area, and a resilient transducer means disposed on said expandable, resilient area generating electric signals in response to said impacts for indicating some characteristic of impacts on said impact area.

24. The boxing glove of claim 23 wherein said transducer means comprises piezoelectric means.

* * * * *